Patented May 19, 1953

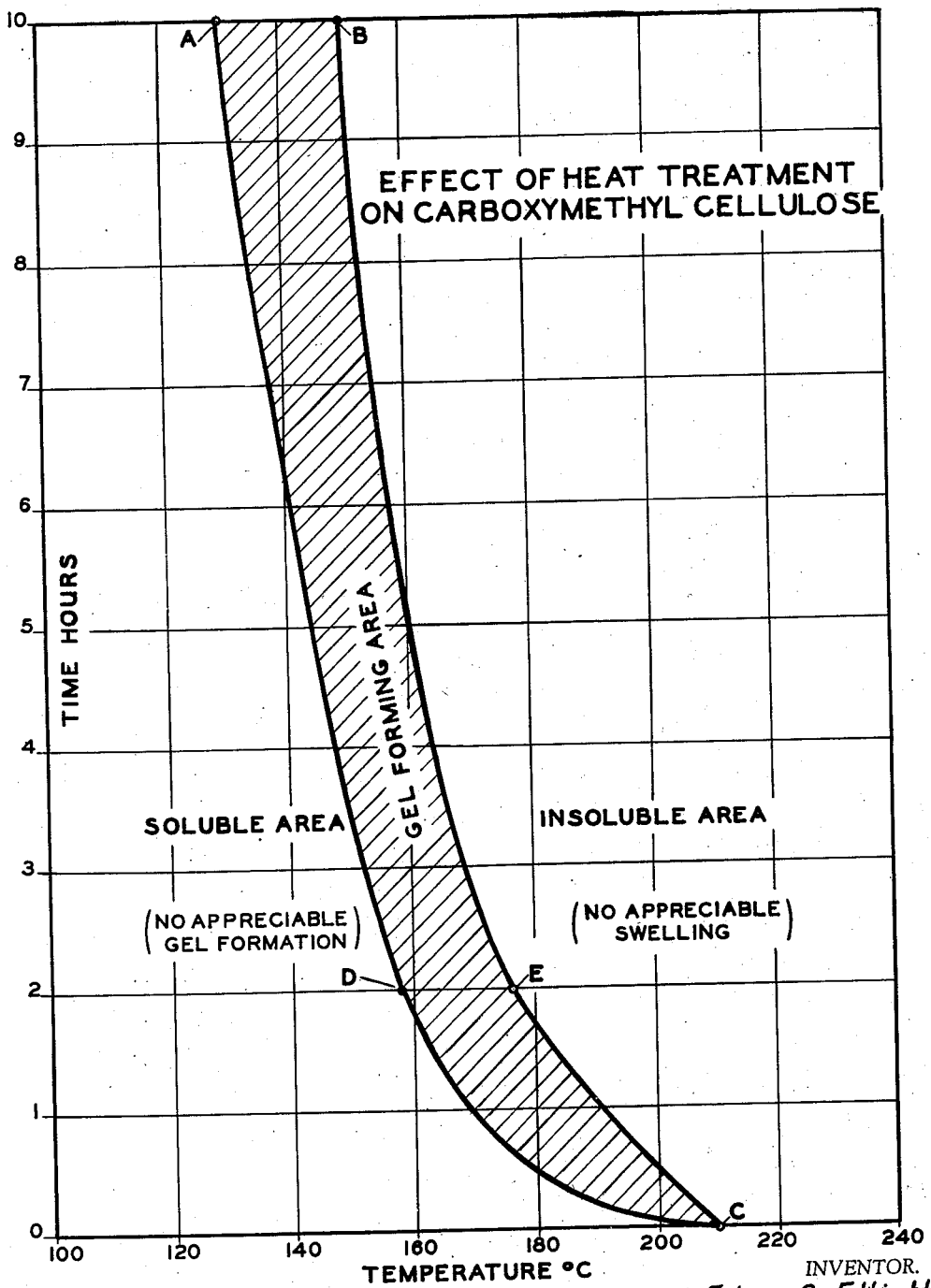

2,639,239

UNITED STATES PATENT OFFICE 2,639,239

HEAT-TREATED ALKALI-METAL CARBOXY-METHYL CELLULOSE AND PROCESS OF PREPARING IT

Edwin S. Elliott, Petersburg, Va., assignor to Hercules Powder Company, Wilmington, Del., a corporation of Delaware Application November 18, 1950, Serial No. 196,408

8 Claims. (Cl. 106—197)

This invention relates to an alkali-metal carboxymethylcellulose and particularly to an alkali-metal carboxymethylcellulose having unusual swelling and gel-forming characteristics in water and to a method of preparing it.

One object of the invention is to provide an alkali-metal carboxymethylcellulose swellable in water to highly-swollen, discrete gel particles and dispersible in water to form a uniform, stable, aqueous suspension of highly-swollen gels.

Another object of the invention is to provide a method for treating a water-soluble carboxymethylcellulose to develop gel-forming characteristics in water.

Still another object of the invention is to provide an aqueous gel suspension of highly-swollen gel particles of an alkali-metal carboxymethylcellulose.

Other objects will appear hereinafter, the novel features being set forth in the claims.

These objects are accomplished in accordance with the present invention by subjecting a substantially dry, particulate, water-soluble alkali-metal salt of carboxymethylcellulose having between about 0.5 and about 1 carboxymethyl group for each anhydroglucose unit in the cellulose to a thermal treatment wherein both time and temperature of treatment are coordinated within the limits defined by the area ABC in the attached drawing. Preferably, time and temperature of treatment are coordinated within the limits defined by the area CDE in the attached drawing.

A water-soluble alkali-metal salt of carboxymethylcellulose which has been subjected to the thermal treatment in accordance with this invention develops unusual gel-forming characteristics in water not present in the water-soluble material from which it is derived. The thermally treated product of this invention swells in water having pH values between about 6 and about 10 to form separate, discrete, highly-swollen gel particles. Furthermore, it disperses in water having pH values between about 6 and about 10 to form a uniform, stable, aqueous suspension of separate, discrete, highly-swollen gels. It is further characterized by dissolving substantially completely in aqueous alkaline solutions having pH values above about 10.5 to form uniform, smooth solutions.

The invention is illustrated by the following specific embodiments thereof but these are not to be construed as limiting the invention.

Example 1

A sample of a commercially available air-dry, granular, sodium carboxymethylcellulose designated as "Hercules CMC—70–H," manufactured by the Hercules Powder Company, Wilmington, Delaware, having approximately 0.75 carboxymethyl group for each anhydroglucose unit in the cellulose was heated on trays in an air oven at 175° C. for one hour. It was then removed from the oven and cooled to room temperature. Visual observation showed the thermally treated material to be substantially identical in appearance to the original starting material, and analysis showed that the degree of carboxymethyl substitution had not been altered by this thermal treatment.

Four-tenths part by weight of the thermally treated sodium carboxymethylcellulose was placed in 99.6 parts by weight of distilled water and agitated. The individual granules did not dissolve in the water. Instead, substantially all particles were observed to swell enormously in the water and become semitransparent. Substantially all particles were observed to swell uniformly, and the uniformly highly-swollen gels were dispersed or distributed uniformly throughout the water to form a uniform, stable, aqueous suspension of separate, discrete, highly-swollen gels. These gels did not settle out or separate from the water phase of the suspension upon standing undisturbed for several days.

A few drops of the aqueous suspension of highly-swollen gels were stained with methylene blue dye and were examined under a microscope. All particles were observed to be highly-swollen gels. A substantial proportion of the gels, estimated to be between 75 and 90% of the total gels, were observed to have diameters between 10 and 15 times the diameters of the thermally treated dry particles. A relatively small proportion of the gels, estimated to be between 10 and 25% of the total gels, were observed to have diameters ranging from 2½ to 10 times the diameters of the thermally treated dry particles.

Sufficient sodium hydroxide was added to the aqueous suspension of thermally treated sodium carboxymethylcellulose gels to raise the pH to a value of 10.5. The gels dissolved substantially completely to form a smooth homogeneous solution.

Example 2

A sample of the same sodium carboxymethylcellulose employed in Example 1 was heated in an air oven at 200° C. for 20 minutes, removed, and cooled to room temperature. This thermally treated sample was observed to have substantially the same properties and characteristics as the thermally treated material in Example 1.

Example 3

A sample of the same sodium carboxymethylcellulose employed in Examples 1 and 2 was heated in an air oven for 7 hours at 150° C. Upon removal from the oven and cooling to room temperature, it was observed to have substantially the same properties and characteristics as the thermally treated material in Examples 1 and 2.

Example 4

Several additional samples of the same sodium carboxymethylcellulose used in Examples 1–3 were treated as follows. Each sample was heated at a definite specified temperature (a different temperature for each sample) and portions were withdrawn from time to time at definite time intervals and tested for behavior in distilled water. In this manner data were obtained for the temperature range between 100° C. and 210° C. These data were employed to establish the areas illustrated in the attached drawing. All samples which received a thermal treatment wherein both time and temperature of treatment were coordinated within the area ABC on the drawing exhibited substantially the same gel-forming properties and characteristics as those possessed by the thermally treated material in Examples 1, 2, and 3.

For the purposes of this invention it is important that both time and temperature of treatment be coordinated within the limits defined by the area ABC, designated "Gel Forming Area" in the appended drawing. Within this area of treatment a water-soluble alkali-metal salt of carboxymethylcellulose develops unusual gel-forming characteristics in water not present in the water-soluble material from which it is derived. The thermally treated particles of carboxymethylcellulose salt in accordance with this invention swell enormously when immersed in water having a pH between about 6 and about 10, but they do not dissolve to form a homogeneous solution.

By inspection of the drawing it will be seen that the gel-forming area of thermal treatment in accordance with this invention, area ABC, is bounded on either side by an inoperable area of thermal treatment within each of which satisfactory gel-forming characteristics are not developed in a water-soluble alkali-metal salt of carboxymethylcellulose. The area to the left of line ADC designated "Soluble Area" represents an area of insufficient thermal treatment wherein no appreciable gel-forming characteristics are developed in the alkali-metal salt of carboxymethylcellulose. In other words, the original water-soluble character of the starting material has not been appreciably altered, and the material is still substantially completely water soluble. The area to the right of line BEC designated "Insoluble Area" represents an area of excessive thermal treatment wherein the alkali-metal salt of carboxymethylcellulose has been rendered completely insoluble in water, and is incapable of appreciable swelling in water. When immersed in water the excessively treated particles of alkali-metal salt of carboxymethylcellulose do not appear to be affected in any way, that is, they do not swell or change in appearance. When shaken up with water and allowed to stand undisturbed the excessively treated particles settle out rapidly leaving a clear water phase above them.

Inspection of the drawing shows clearly that there is considerable choice of both temperature and time conditions within the operable gel-forming area of thermal treatment, area ABC. The only necessary requirement is that both time and temperature conditions of treatment be coordinated to lie within the area ABC. Either time or temperature of treatment may be selected arbitrarily within the limits defined by the area ABC, and the other variable is then coordinated so that both time and temperature of treatment fall within area ABC. Ordinarily, it is more convenient to select the temperature of treatment and then coordinate time of treatment with the selected temperature to come within area ABC.

Although area ABC defines the broad operable area in accordance with this invention, it is preferred to operate within the more narrowly defined area CDE which constitutes the lower portion of operable area ABC. Area CDE is the preferred area of thermal treatment because it has been found to be the most practical range, both economically and from the standpoint of ease of control.

In practicing the process of this invention it is advisable to select time and temperature conditions of treatment falling well inside the boundaries of the area ABC. This is to insure development of optimum gel-forming characteristics in the alkali-metal salt of carboxymethylcellulose.

A variety of heating means can be employed in carrying out the thermal treatment in accordance with this invention, and the treatment can be either a batchwise process or a continuous process as desired. Batchwise, the process can be carried out in air ovens, in closed autoclaves, in infrared ovens, and the like. The process can be carried out continuously in rotating kiln driers, or employing a continuous conveyor system passing through heated ovens or under banks of infrared lamps and the like. Higher temperatures of treatment, in the neighborhood of 200° C., for example, are particularly adapted for continuous operation, since only a few minutes, or even less, are required to develop the desired gel-forming characteristics in the alkali-metal salt of carboxymethylcellulose.

The process in accordance with this invention calls for treatment of a substantially dry, particulate, water-soluble alkali-metal salt of carboxymethylcellulose having between about 0.5 and about 1 carboxymethyl group for each anhydroglucose unit in the cellulose. Any water-soluble alkali-metal salt of carboxymethylcellulose having a degree of substitution between about 0.5 and about 1 carboxymethyl group per anhydroglucose unit is satisfactory, including the lithium, sodium, potassium, rubidium, and cesium salts. However, an alkali-metal salt having a degree of substitution between about 0.7 and about 0.9 carboxymethyl group per anhydroglucose unit is preferred, and particularly the sodium salt having this preferred range of substitution.

By substantially dry is meant ordinary air-dry material such as the commercially available carboxymethylcellulose salts exemplified by Hercules CMC and other similar products. It is to be understood, of course, that under the usual conditions of storage and use an air-dry carboxymethylcellulose salt may contain several per cent by weight of moisture and yet be a substantially dry, free-flowing granular or flake material.

The particulate alkali-metal salts of carboxymethylcellulose may be in the form of granules, fibers, flakes, and the like, and for optimum results the granules, fibers, flakes, and the like should be relatively uniform in size, as exemplified, for example, by a commercial product such as Hercules CMC. Although coarser particles can be employed, it is preferable to employ finer particles such as will pass through a 40-mesh, 100-mesh, or even a 200-mesh screen.

The water-soluble alkali-metal salts of carboxymethylcellulose in accordance with this invention can be of any viscosity type. Suitable materials can have a viscosity as low as 10 cps. or even lower as measured on a 2% by weight solution in water at 25° C. employing a Brookfield viscometer model LVF using a No. 1 spindle at 60 R. P. M., or as high as 5000 cps. or even higher as measured on a 1% by weight solution in water at 25° C. using a No. 3 spindle at 30 R. P. M. in the same Brookfield viscometer.

In the dry state the thermally treated alkali-metal salt of carboxymethylcellulose in accordance with this invention has substantially the same physical appearance as the original water-soluble salt from which it is derived. Furthermore, analysis indicates that no change in carboxymethyl substitution is brought about by subjecting the water-soluble alkali-metal salt of carboxymethylcellulose to the thermal treatment of this invention. However, when placed in water having a pH between about 6 and about 10 the behavior of the thermally treated product is in marked contrast to the behavior of the original water-soluble product from which it is derived. The thermally treated particles of alkali-metal salt of carboxymethylcellulose swell enormously in water and become semitransparent, but each particle, although greatly swollen and softened in the water, retains its individual identity. The swollen particles disperse uniformly throughout the water to form a uniform, stable, aqueous suspension of separate, discrete, highly-swollen gels. Moreover, these gels do not tend to settle out or separate from the water phase of the suspension on standing even in highly dilute suspensions containing as little as 0.2 or 0.3% by weight of the thermally treated carboxymethylcellulose salt. The original water-soluble carboxymethylcellulose salt, on the other hand, dissolves substantially completely in water having a pH between about 6 and about 10 to form a solution.

When immersed in water having a pH between about 6 and about 10 the particles of the thermally treated product of this invention become highly-swollen gels, substantially all of which have diameters at least about 2.5 times the diameters of the dry particles. Under optimum conditions of thermal treatment a substantial proportion of these gels, at least about 75% of them, have diameters at least about ten times the diameters of the dry particles.

When immersed in alkaline solutions having a pH at least about 10.5 the thermally treated alkali-metal salts of carboxymethylcellulose in accordance with this invention dissolve to form uniform, smooth solutions.

The thermally treated product of this invention is particularly useful as a sizing agent for paper to impart both wet and dry strength to the paper. It is also useful as a sizing agent for textiles and in certain types of adhesives, particularly for use on porous surfaces where a surface film is required without appreciable penetration into the material.

What I claim and desire to protect by Letters Patent is:

1. A process for reducing the solubility of a water-soluble alkali-metal salt of carboxymethylcellulose having between about 0.5 and about 1 carboxymethyl group for each anhydroglucose unit in the cellulose which comprises subjecting the said water-soluble salt in a substantially dry and finely-divided particulate form to a temperature between about 130° C. and about 210° C. under time and temperature conditions within the area ABC as defined on the appended drawing to form a heat-treated salt of reduced solubility characterized by the formation of separate, discrete, highly-swollen gel particles substantially all of which have diameters at least 2½ times, and a substantial majority of which have diameters at least 10 times the diameters of the dry particles when suspended in water having pH values between about 6 and about 10.

2. A process for reducing the solubility of a water-soluble alkali-metal salt of carboxymethylcellulose having between about 0.7 and about 0.9 carboxymethyl group for each anhydroglucose unit in the cellulose which comprises subjecting the said water-soluble salt in a substantially dry and finely-divided particulate form to a temperature between about 130° C. and about 210° C. under time and temperature conditions within the area ABC as defined on the appended drawing to form a heat-treated salt of reduced solubility characterized by the formation of separate, discrete, highly-swollen gel particles substantially all of which have diameters at least 2½ times, and a substantial majority of which have diameters at least 10 times the diameters of the dry particles when suspended in water having pH values between about 6 and about 10.

3. A process for reducing the solubility of a water-soluble sodium salt of carboxymethylcellulose having between about 0.7 and about 0.9 carboxymethyl group for each anhydroglucose unit in the cellulose which comprises subjecting the said water-soluble salt in a substantially dry and finely-divided particulate form to a temperature between about 130° C. and about 210° C. under time and temperature conditions within the area ABC as defined on the appended drawing to form a heat-treated salt of reduced solubility characterized by the formation of separate, discrete, highly-swollen gel particles substantially all of which have diameters at least 2½ times, and a substantial majority of which have diameters at least 10 times the diameters of the dry particles when suspended in water having pH values between about 6 and about 10.

4. A process for reducing the solubility of a water-soluble alkali-metal salt of carboxymethylcellulose having between about 0.5 and about 1 carboxymethyl group for each anhydroglucose unit in the cellulose which comprises subjecting the said water-soluble salt in a substantially dry and finely-divided particulate form to a temperature between about 158° C. and about 210° C. under time and temperature conditions within the area CDE as defined on the appended drawing to form a heat-treated salt of reduced solubility characterized by the formation of separate, discrete, highly-swollen gel particles substantially all of which have diameters at least 2½ times, and a substantial majority of which have diameters at least 10 times the diameters of the dry particles when suspended in water having pH values between about 6 and about 10.

5. A process for reducing the solubility of a water-soluble alkali-metal salt of carboxymethylcellulose having between about 0.7 and about 0.9 carboxymethyl group for each anhydroglucose unit in the cellulose which comprises subjecting the said water-soluble salt in a substantially dry and finely-divided particulate form to a temperature between about 158° C. and about 210° C.

under time and temperature conditions within the area CDE as defined on the appended drawing to form a heat-treated salt of reduced solubility characterized by the formation of separate, discrete, highly-swollen gel particles substantially all of which have diameters at least 2½ times, and a substantial majority of which have diameters at least 10 times the diameters of the dry particles when suspended in water having pH values between about 6 and about 10.

6. A process for reducing the solubility of a water-soluble sodium salt of carboxymethylcellulose having between about 0.7 and about 0.9 carboxymethyl group for each anhydroglucose unit in the cellulose which comprises subjecting the said water-soluble salt in a substantially dry and finely-divided particulate form to a temperature between about 158° C. and about 210° C. under time and temperature conditions within the area CDE as defined on the appended drawing to form a heat-treated salt of reduced solubility characterized by the formation of separate, discrete, highly-swollen gel particles substantially all of which have diameters at least 2½ times, and a substantial majority of which have diameters at least 10 times the diameters of the dry particles when suspended in water having pH values between about 6 and about 10.

7. A substantially dry, particulate, heat-treated alkali-metal salt of carboxymethylcellulose of reduced solubility made in accordance with the process of claim 1 and characterized by the formation of separate, discrete, highly-swollen gel particles substantially all of which have diameters at least 2½ times, and a substantial majority of which have diameters at least 10 times the diameters of the dry particles when suspended in water having pH values between about 6 and about 10.

8. An aqueous gel suspension comprising a heat-treated alkali-metal salt of carboxymethylcellulose of reduced solubility, made in accordance with the process of claim 1, suspended in water having a pH value between about 6 and about 10.

EDWIN S. ELLIOTT.

References Cited in the file of this patent

UNITED STATES PATENTS

| Number | Name | Date |
|---|---|---|
| 2,060,056 | Ellsworth | Nov. 10, 1936 |
| 2,265,919 | Lilienfeld | Dec. 9, 1941 |
| 2,288,200 | Meyer | June 30, 1942 |
| 2,476,331 | Swinehart et al. | July 19, 1949 |

FOREIGN PATENTS

| Number | Country | Date |
|---|---|---|
| 808,699 | France | Feb. 12, 1937 |

OTHER REFERENCES

Sodium Carboxymethylcellulose, Hercules (1944), pages 2 and 3, Hercules Powder Co., Wilmington, Del.